United States Patent Office 3,562,205
Patented Feb. 9, 1971

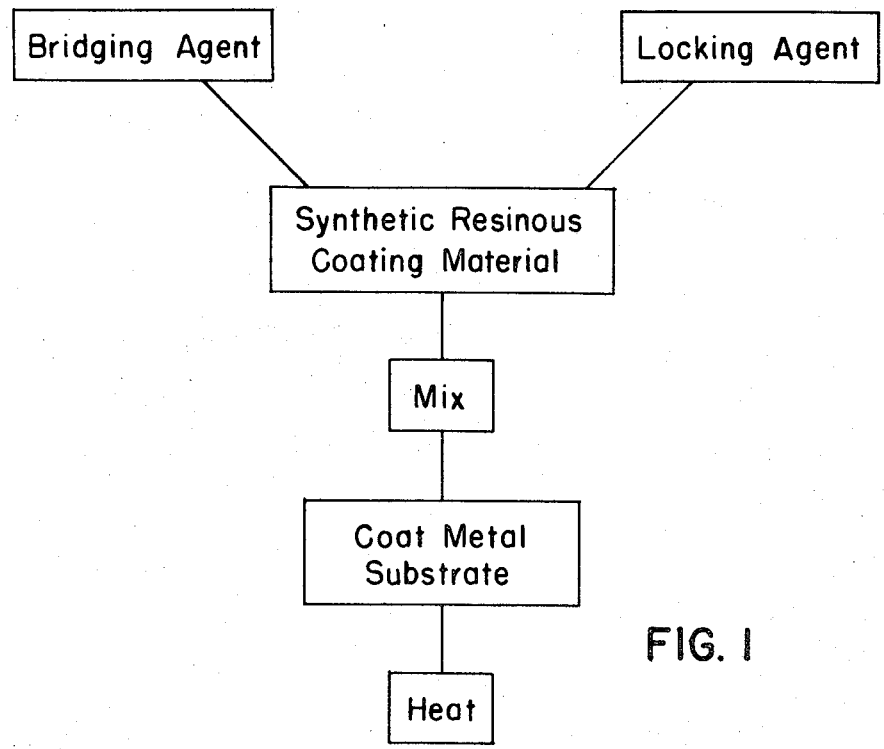
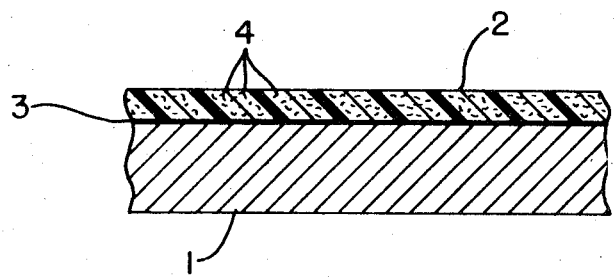

3,562,205
COATING COMPOSITION FOR ADHERING SYNTHETIC RESINS TO METAL SUBSTRATES
Douglas S. Richart, Reading, Pa., assignor to The Polymer Corporation, Reading, Pa., a corporation of Pennsylvania
Continuation-in-part of application Ser. No. 539,803, Apr. 4, 1966. This application May 12, 1969, Ser. No. 823,595
Int. Cl. C08f 29/18; C08g 41/02
U.S. Cl. 260—41         7 Claims

ABSTRACT OF THE DISCLOSURE

A coating composition consisting essentially of polyvinyl chloride or polyamides; finely divided metals, metal oxides or metal salts and finely divided non-film forming nitrogen-containing organic compounds in which the compound has at least two nitrogen atoms or the nitrogen atom is linked to another atom of the compound by a multiple bond with the nitrogen compound evolving less than about 20 milliliters of gas per gram at the fusion temperature of the resin. The composition is applied to metals and then heated to form a protective coating without the need for a primer.

---

This application is a continuation-in-part of my copending application Ser. No. 539,803, filed Apr. 4, 1966, now abandoned, entitled Coating Materials and Methods for Their Application.

This invention relates to synthetic resinous thermoplastic coating compositions and, more particularly, to resinous thermoplastic coating compositions that will adhere to substrates, to novel methods for perfecting such adhesion, and to the improved protective coatings that result therefrom.

The use of synthetic resinous thermoplastic materials to form protective coatings over various substrates has assumed great commercial importance. In addition to being decorative, these coating materials can protect a substrate from oxidation and other forms of corrosion; they can prevent damage to a substrate by absorbing shocks such as caused by impact; and, if desired, they can provide a substrate with both thermal and electrical insulation.

Except in those specialized circumstances in which strippable coatings are desired, the performance of a protective coating is largely dependent upon the tenacity with which the coating material adheres to its substrate. This adhesion is necessary not only to prevent the coating material from being peeled away from the substrate, but is also necessary to prevent the spread of underfilm corrosion should any discontinuity or break occur in the coating layer. Since good adhesion between the coating layer and the substrate is of such importance, considerable research and development efforts have been devoted to the task of developing methods and means for improving the adhesion between synthetic resinous thermoplastic coating materials and the substrate to which they are applied.

The most significant improvements that have been made in improving the adhesion of synthetic resinous thermoplastic materials to substrates have been achieved through the use of primers. These primers, which can be comprised of a whole host of inorganic and organic compounds and combinations thereof, are most frequently applied to a substrate, preferably after it has been carefully cleaned, in the form of a solution coating. After the primer has been dried, a resinous coating is applied to the primed substrate. While the phenomenon is not well understood, it is believed that some sort of forces, which are variously described as being physical, electrical, chemical, or combinations thereof, cause bonds to be established between the primer and the coating. Thus, the primer may be thought of as a tying link or bridge between the substrate and the coating layer.

The formulation and use of primers has become an art of considerable sophistication. It is not uncommon, by using appropriately selected primers, to cause layers of coating material to adhere so tightly to a substrate that the strength of the bond will exceed the film strength of the coating itself. These results can be obtained even with coating materials such as vinyls that have practically no inherent ability to adhere to a substrate.

Despite the excellent results that can be obtained with some primers, their use is not a perfect solution to the problem of obtaining adhesion. This results from the practical consideration that the pretreatment required to apply and bake a primer on a substrate is at best a time-consuming and bothersome affair. This is further aggravated due to the fact that primers are usually applied from solutions comprised of highly volatile solvents and special precautions facilities are required to guard against the hazards of fire and explosion.

In still other instances, it has been almost impossible to find satisfactory primers for use with certain resins, particularly those of exceptional stability, such as fluorinated resins, chlorinated polyethers, polyolefins, and the like.

Accordingly, it is an object of this invention to provide synthetic resinous thermoplastic coating materials that will adhere to metal substrates.

Another object of this invention is to prepare synthetic resinous thermoplastic coating materials that do not require the use of primers to obtain adequate adhesion to a substrate.

Still another object of this invention is to provide methods for treating coated articles to improve the adhesion between the substrate and a coating layer of synthetic resinous thermoplastic coating materials.

Yet another object of this invention is to provide coated articles having a high order of adhesion between the substrate and a coating layer of synthetic resinous thermoplastic coating materials.

Briefly, these and other objects of this invention are achieved by formulating a coating composition to include an intimate mixture of the following:

(1) A heat-fusible, synthetic resinous, thermoplastic, film-forming material;

(2) A finely divided metal or metal-containing compound that is infusible at the fusion temperatures of said synthetic resinous material; and (3) A finely divided, non-film-forming, nitrogen-containing compound of the kind which does not decompose at fusion temperatures to form gaseous products.

Additionally, as may be required, heat is utilized to improve the bond between such a coating composition and the substrate to which it has been applied.

While the theoretical basis for this invention is not fully understood, it has been hypothesized that the nitrogen-containing compounds act as a bridge or link between the substrate and the metal or metal compound. If this is true, the nitrogen-containing compounds act in a fashion similar to chelating agents and attach themselves at one of their sites to the metallic substrate and attach themselves at another of their sites to the metal or metal compound dispersed throughout and locked within the matrix of the coating material.

For convenience, and for want of better terminology, the nitrogen-containing compounds are arbitrarily referred to herein as "bridging agents" and the metal or metal compounds are arbitrarily referred to as "locking agents." It must be understood that this terminology has been selected only for convenience and is not intended to limit or restrict the within-described invention to any particular theory. It is thought desirable to set forth this theory, however, since the theory is consistent with the currently available data and thus is an aid to understanding the invention. Additionally, support for this theory may be found in the fact that good adhesion is generally not achieved using the coating compositions of this invention unless and until the coated substrate is heated to elevated temperatures. This fact, coupled with the observation that fine bubbles are generated at the interface between the coating material and the substrate during exposure to such temperatures, suggests that some evolution of gases is taking place, which in turn suggests that a reaction is taking place between the several components of the coating composition and the surface of the substrate.

THE LOCKING AGENTS

The locking agents that have proved particularly useful in the practice of this invention are comprised of metals and various metallic compounds, including metallic salts, oxides, and the like. Examples of such materials include metals such as lead, iron, titanium, chromium and manganese; oxides of these metals; inorganic salts of these metals such as phosphate salts; and certain organic salts of these metals such as of phthalic anhydride and the like. Lead and lead-containing compounds appear to function in a superior manner and are thus the preferred class of locking agents.

As the effectiveness of the locking agents is believed to depend upon a surface phenomenon, it is important that they be in finely divided form when they are added to the coating material. In addition to maximizing their surface area, the small particle size makes it easier to obtain a thorough and uniform dispersion of the particles throughout the coating material. While no critical upper limit can be established for the size of the locking agents, it is generally preferred that they be less than 150 microns.

It is often advantageous to include more than one locking agent in the coating material, as a plurality of locking agents sometimes prove more effective than a single one.

The quantity of locking agents added to the coating material does not seem to be critical, and as little as about 2 parts by weight locking agent to 100 parts by weight of resinous film-forming material have provided beneficial results. Some increase in adhesion is noted as the quantity of locking agent is increased within limits, but usually no significant improvements can be noted after about 20 parts by weight of locking agent is exceeded. Generally, it is not desirable to exceed this amount as the properties of the coating material may be adversely affected.

THE BRIDGING AGENTS

The bridging agents which have been found most effective may be categorized as non-film-forming, nitrogen-containing materials of the kind which do not materially decompose at fusion temperatures to form gaseous products. The preferred nitrogen-containing compounds are those in which more than one nitrogen atom is present, and still more preferably, those in which one nitrogen atom is linked to another nitrogen atom within the molecule, as well as those in which one nitrogen atom is linked to another atom of the molecule by means of a double or triple bond. To illustrate some of the more effective nitrogen-containing compounds selected from the above class, the following may be mentioned by way of example:

hydrazine:

$$H_2N-NH_2$$

hydrazides:

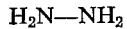
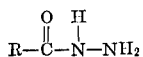

dihydrazides:

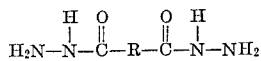

hydrazones: $R_2C=N-NH_2$
azines: $R_2C=N-N=CR_2$ dicyanamides:

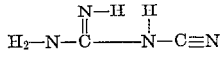

Also, certain sulfur substituted analogs of the above compounds, such as thiohydrazides and thiodihydrazides, have proved effective.

Nitrogen-containing compounds, considered broadly, (and also various other organic and inorganic materials) have been incorporated into thermoplastic resins in the past to function as foaming agents or blowing agents in the production of foamed plastic. For this function, it is desired that the nitrogen compounds evolve appreciable quantities of gas upon being heated to the foaming temperature. The gas evolution property is customarily expressed in terms of milliliters of gas evolved per gram of solid or liquid heated to the gas evolution temperature, and it is usually desired that a foaming agent have a gas evolution number of about 125 milliliters or more.

By contrast, the nitrogen compounds useful in the practice of this invention, in addition to meeting the requirements discussed above, are ones which do not evolve large quantities of gas at the temperatures involved in the process of the invention. It is desired that little or no gas be evolved because the coatings formed should be substantially solid and coherent. The function thus exploited for the nitrogen compounds is the new function of acting as bridging agents, while their foaming function is avoided or minimized. Generally speaking, nitrogen compounds meeting the above requirements, and which also evolve less than about 20 milliliters of gas per gram at the temperatures utilized in the invention, are suitable and may be regarded as substantially non-foaming in the context of the invention. All of the compounds listed above by way of illustration meet this requirement.

While there does not seem to be any particularly critical quantity of bridging agent that should be added to the coating material, from about 0.2 to about 1 part by weight bridging agent per 100 parts by weight of resinous film-forming materials has proved quite effective. To exceed this amount will not adversely affect adhesion, but may modify the properties of the coating material. For this reason, it is generally undesirable to include more than about 20 parts by weight of the bridging agent.

THE SUBSTRATE

The use of bridging and locking agents as described in this specification has proved particularly effective in obtaining adhesion of the coating with metal-surfaced substrates, including those comprised of common metals such as iron, steel, aluminum, copper, brass, and the like. Especially good results have been obtained when a metallic oxide layer is provided over the surface of the substrate. Furthermore, improvement in adhesion is also noted when the substrate has been roughened, as by sandblasting, and this should thus be regarded as a preferred procedure.

THE APPLICATION OF THE COATING MATERIAL

The method by which the coating material is applied to the substrate is not critical and any of the conventional techniques may be used. For example, the coating material may be applied by wet methods, such as those that utilize plastisols and organisols, or it may be applied by heat fusion processes, including flame spraying, electrostatic spraying, fluidized bed, and the like. In addition to forming a protective layer, the coating may be used for adhering a plurality of layers as in laminating and the like.

All of the preceding coating methods utilize elevated temperatures to perfect the coating. In the case of wet coating methods, heat is required to remove solvents and, in the case of plastisols, to complete the solvation of the plasticizer. In the case of heat fusion processes, the coating materials are utilized in the form of solid discrete particles and heat must be applied to cause them to melt out or fuse over the substrate.

For convenience herein and in the appended claims, the term "fusion temperatures" refers to those temperatures that are required to perfect the coating whether it be solvent removal in the case of organisols, solvation in the case of plastisols, or melting in the case of heat fusion processes.

THE HEAT TREATMENT

The degree of adherence of the coating to the substrate may be materially improved by exposure of the coating material to elevated temperatures. (Temperatures in the range of from about 400° F. to about 750° F. have proved particularly effective.) As will be appreciated from the above discussion, the particular temperature employed should be correlated with the particular bridging agent used to insure that the gas evolution is held within the limits set out above. As mentioned above, these elevated temperatures may cause a chemical reaction to take place between the substrate and the bridging agent and the bridging agent and the locking agent. This theory receives some support from the fact that tiny bubbles may be observed in the coating material at its interface with the substrate. Possibly these bubbles are caused by gases, such as hydrogen or nitrogen, that are evolved from the bridging agent during its reaction with the substrate and the locking agent. The heat treatment here discussed frequently requires temperatures somewhat higher than the fusion temperature. For convenience herein and in the appended claims, the term "curing temperature" will be used to mean the temperatures required to perfect adhesion and, accordingly, is to be distinguished from the above-defined fusion temperature necessary to perfect the coating.

MODERATORS

It has also been observed that the temperatures at which good adhesion is obtained can be significantly reduced by including certain compounds in the coating material which, for want of a better term, are herein called "moderators." While these moderators by themselves do not seem to promote adhesion, they apparently have a synergistic or catalytic effect upon the bridging agent and cause it to become active at lower temperatures. For example, through the use of moderators, the temperature of the heat treatment may be reduced by as much as 50° F. to 150° F. without a noticeable sacrifice in the degree of adhesion. The moderators that have been most effective are in a class comprised of primary and secondary amines. Tri(dimethylaminomethyl)phenol is a preferred example of one such moderator. This material, and similar ones, have been used as catalysts in thermosetting epoxy resin systems, but this use casts no light on the mechanism by which the amines discussed here are effective moderators in the present coating systems using thermoplastic resins.

THE RESINOUS COATING COMPOSITIONS

The synthetic resinous thermoplastic coating materials with which the invention is primarily concerned are those prepared from polyvinyl chloride and polyamides, since it is with coating materials based on these resins that the best results are obtained in accordance with the invention. Conventional additives, such as plasticizers, solvents, and pigments, may be included in the coating compositions, in addition to the special materials of the invention, as will be seen from the examples. Some improvement is gained in the practice of the invention with polyolefins, fluorinated resins, and cellulosics, but these resins are not in the preferred group. Some thermosetting resins, such as epoxides, unlike most thermoplastics, have inherently good adhesion properties and thus do not substantially require the materials and steps of the invention.

THE DRAWINGS

With reference to the drawings, FIG. 1 is a representation of the process of this invention, and FIG. 2 is a schematic illustration in cross section of a substrate coated with a synthetic resinous thermoplastic material in accordance with this invention.

As shown in FIG. 2, the metal substrate 1 is coated with a synthetic resinous thermoplastic material 2. The interface between the substrate and the coating is shown as at 3. Contained within the matrix of the coating material 2 are a plurality of finely divided particles 4.

EXAMPLES

In the following examples, all quantities of the indicated ingredients are listed in parts by weight. Adhesion was determined by cutting a ¼ inch wide strip with a sharp knife on a coated metallic plate and then attempting to peel the coating back from the substrate. The arbitrary scale of values used in evaluating adhesion was as follows:

Excellent

The coating material cannot be completely removed from the substrate since the adhesive strength of the bond exceeds the cohesive strength of the coating material;

Good

The coating material can be removed only with difficulty, and the adhesive strength of the bond and the cohesive strength of the coating material are roughly equivalent;

Fair

The coating can be peeled away from the substrate with comparative ease, and the adhesive strength of the bond is quite low as compared with the cohesive strength of the coating material;

None

The coating material can be lifted off without difficulty.

EXAMPLE I

A vinyl coating composition suitable for use in the fluidized bed coating process was prepared by mixing the following ingredients together on a two-roll mill heated to 300° F.

| | |
|---|---|
| Polyvinyl chloride having a specific viscosity of 0.30 (sold under the trade designation Marvanol VR–25) | 100 |
| Dioctylphthalate (a plasticizer) | 35 |
| Titanium dioxide (a pigment and locking agent) | 10 |
| Octyl epoxy tallate (a stabilizing plasticizer) | 5 |
| Disbasic lead phosphite (a stabilizer and locking agent sold under the trade designation Dyphos) | 8 |
| Terephthalic dihydrazide (a bridging agent) | 0.5 |
| Tri(methylaminomethyl)phenol (a moderator sold under the trade designation DMP–30) | 0.5 |

The product of the above was cut into small pieces and ground in a pin mill until all of the powder passed through a 70 mesh screen. 3% of a plastisol-grade PVC resin (sold under the trade designation GEON–126) was added to improve powder flow characteristics.

The above powder was then fluidized and a cleaned and sandblasted cold rolled steel panel was coated using conventional fluidized bed coating techniques as follows. The steel panel was preheated to a temperature of 575° F. and then immersed for 4 seconds in a fluidized bed of coating material. The panel was then removed from the fluidized bed and placed in a post-heat oven at 450° F. for 5 seconds. This resulted in a coating thickness of about 13 mils uniformly distributed over the panel. The adhesion was found to be between Good and Excellent.

A similar panel was placed in a device for measuring weather resistance under accelerated conditions (Weatherometer). While the coating showed slight loss of gloss and some fading after 5,000 hours in this test apparatus, the substrate protection was excellent and there were no observable signs of corrosion.

EXAMPLE II

The identical coating material of Example I was prepared except that the titanium dioxide and the dibasic lead phosphite were omitted. When a steel panel was coated under conditions similar to those of Example I, the adhesion was rated as None.

EXAMPLE III

The identical coating material of Example I was prepared except that the terephthalic dihydrazide was omitted. When a steel panel was coated under conditions similar to those of Example I, the adhesion was rated as None.

EXAMPLE IV

The identical coating material of Example I was prepared except that the tri(dimethylaminomethyl) phenol was omitted. In coating a steel panel under conditions similar to those of Example I, it was necessary to increase the temperature to which the panel was preheated to 625° F. to obtain the same adhesion degree as obtained in Example I.

EXAMPLE V

A plastisol coating composition was prepared by mixing the following ingredients in a Cowles dissolver:

| | |
|---|---|
| PVC paste grade resin (sold under the trade designation Marvanol VR–50) | 80 |
| Finely divided PVC resin used to modify the viscosity of the plastisol (sold under the trade designation Marvanol VR–10) | 20 |
| Dioctylphthalate (a plasticizer) | 75 |
| Epoxidized soya oil (a plasticizer sold under the trade designation Paraplex G–62) | 5 |
| Tribasic lead oxide (a minus 325 mesh locking agent sold under the trade designation Tribase) | 4 |
| Terephthalic dihydrazide (a bridging agent) | 1 |
| Tri(dimethylaminomethyl)phenol (a moderator sold under the trade designation DMP–30) | 1 |

Clean steel panels were dipped in the above plastisol and baked for 15 minutes in an oven at 450° F. The adhesion obtained was rated as Good.

EXAMPLE VI

A clean steel panel was coated with the same plastisol as Example V, but was baked in an oven for 15 minutes at 500° F. In this instance, the adhesion was Excellent.

EXAMPLE VII

A vinyl coating composition for use in the fluidized bed coating process was prepared by a method identical to that as described in Example I. The composition of this material was as follows:

| | |
|---|---|
| PVC resin (specific viscosity 0.30, sold under the trade designation Marvanol VR–25) | 100 |
| Dioctylphthalate (a plasticizer) | 35 |
| Octyl epoxy tallate (a stabilizing plasticizer) | 5 |
| Titanium dioxide (a pigment and locking agent) | 10 |
| Tribasic lead oxide (minus 325 mesh locking agent sold under the trade designation Tribase) | 4 |
| Adipic dihydrazide (a bridging agent) | 0.5 |

Clean sandblasted steel panels, ⅛ inch thick, were preheated to 625° F., and dipped into the fluidized bed of the coating composition until a 10–12 mil coating was obtained. This was then postheated for 30 seconds at 450° F. The adhesion between the coating material and the substrate was Excellent.

EXAMPLES VIII–XV

A PVC coating composition was prepared and steel panels were coated using the fluidized bed coating process in the same manner as shown in the above Example VII. The only difference was that adipic dihydrozide was not used in the coating composition as the bridging agent, but rather the follow bridging agents were substituted in the same amount therefore:

Example VIII—Polyethylene hydrazine
Example IX—Hydrazodicarbonthioamide
Example X—Urazine
Example XI—Guanozole
Example XII—Dicyandiamide
Examples XIII—Thiosemicarbazide
Example XIV—Carbohydrazide
Examples XV—Azodicarbonamide In all of the above Examples VIII–XV, the adhesion that was obtained was rated as Excellent.

EXAMPLE XVI

Type 6 nylon powder (polycaprolactam) was ground to a fine powder that passed through a 70 mesh screen. 100 parts of this powder were dry blended with 5 parts of lead silicochromate (sold under the trade designation M–50) and 50 parts dicyanamide in a Henschel mixer.

This mixture was fluidized and a clean sandblasted panel, heated to 650° F., was immersed for 5 seconds in this fluidized coating material. The coated panel was then subjected to a post-heat at 400° F. for 30 seconds. The adhesion was rated as Excellent.

EXAMPLE XVII

A powdered coating composition comprised of 100 parts of a polyacetal (sold under the trade designation Celcon M–25–01) was mixed with 10 parts titanium dioxide and 1 part adipic dihydrazide. This mixture was then extruded through a 1 inch laboratory extruder having a barrel temperature of 350° F. and a nozzle temperature of 375° F. The extrudate was quenched in water and ground to a fine powder that passed through a 70 mesh screen.

The powder prepared in the above manner was dusted over the surface of a clean steel panel heated to 625° F. which subsequently was placed in a post-heat oven for 30 seconds at 655° F. to fuse out the powder into a continuous film. The adhesion of the coating to the substrate was found to be Good.

EXAMPLE XVIII

A solution vinyl coating was prepared having the following composition:

| | |
|---|---|
| A solution grade polyvinyl chloride/polyvinyl acetate (sold under the trade designation VYHH) | 100 |
| Methyl ethyl ketone (a solvent) | 200 |
| Methyl isobutyl ketone (a solvent) | 200 |
| Dioctylphthalate (a plasticizer) | 5 |
| Barium/cadmium/zinc liquid stabilizer of the phenate type (sold under the trade designation Mark KCB) | 1 |
| Tribasic lead oxide (a locking agent sold under the trade designation Tribase) | 2 |
| Terephthalic dihydrazide (a bridging agent) | 0.2 |

Cleaned aluminum and steel panels were dipped in this solution and allowed to air dry for 30 minutes and then baked at 200° F. for 15 minutes to remove all remaining solvent. The coatings were then baked for 10 minutes at 450° F. The adhesion of the coating material to the aluminum substrate was found to be excellent, and the adhesion to the steel substrate was found to be Good.

EXAMPLE XIX

The experiment of Example XVIII was duplicated except that the tribasic lead oxide was omitted from the solution coating. The adhesion of the coating material to both aluminum and steel panels was evaluated as None.

EXAMPLE XX

The experiment of Example XVIII was duplicated except that the terephthalic dihydrazide was omitted from the solution coating. The adhesion of the coating material to both aluminum and steel panels was evaluated None.

EXAMPLE XXI

Example V was duplicated except for the fact that the plastisol coating was applied to a copper substrate. The adhesion was found to be Good.

I claim:

1. A coating composition adapted to adhere to metal substrates in the absence of a primer when applied in a process including heating said composition to fusion temperatures, consisting essentially of an intimate mixture of:
   a heat-fusible, film-forming coating material having a thermoplastic synthetic resin therein selected from the group consisting of polyvinyl chloride and polyamides;
   a finely divided material that is infusible at the fusion temperature of the composition and is selected from the group consisting of metals, metal oxides, and metal salts, said infusible material being present in an amount sufficient to provide a ratio of infusible material to thermoplastic synthetic resin between about 2:100 and about 20:100; and
   a finely divided non-film-forming nitrogen-containing organic compound selected from the group consisting of compounds having at least two nitrogen atoms and compounds having a nitrogen atom linked to another atom of the compound by means of a multiple bond, said compound further being one evolving less than about 20 milliliters of gas per gram at the fusion temperature of the resin, said compound being present in an amount sufficient to provide a weight ratio of nitrogen compound to thermoplastic synthetic resin between about 0.2:100 and about 20:100.

2. A coating composition according to claim 1 wherein the nitrogen-containing compound will evolve less than about 20 milliters of gas per gram at temperatures below abolt 750° F.

3. A coating composition according to claim 1 wherein said nitrogen-containing compound is selected from the group consisting of hydrazine, hydrazides, dihydrazides, hydrozones, azines, thiohydrazides, thiodihydrazides, and dicyanamides.

4. A coating composition according to claim 1 wherein the metal constituent of said finely divided material is selected from a group consisting of lead, iron, titanium, chromium, and manganese.

5. A coating composition according to claim 1 wherein said nitrogen compound is present in an amount sufficient to provide a weight ratio of nitrogen compound to thermoplastic synthetic resin between about 0.2:100 and about 1:100.

6. A coating composition according to claim 1 wherein a minor portion of tri(dimethylaminomethyl)phenol is included.

7. A coating composition according to claim 1 wherein the metal constituent of such finely divided material is lead.

References Cited

UNITED STATES PATENTS

| | | | |
|---|---|---|---|
| 2,844,489 | 7/1958 | Gemmer | 117—21 |
| 2,981,631 | 4/1961 | Nagel | 117—21 |
| 2,997,776 | 8/1961 | Matter et al. | 117—21X |
| 3,039,987 | 6/1962 | Elbling | 117—21 |
| 3,090,696 | 5/1963 | Gemmer | 117—21 |
| 3,102,043 | 8/1963 | Winthrop et al. | 117—21 |
| 3,136,651 | 6/1964 | Spessard | 117—21 |
| 3,161,530 | 12/1964 | Strobel | 117—21 |
| 3,190,845 | 6/1965 | Goodnight | 117—21 |
| 3,211,695 | 10/1965 | Peterson | 117—21 |
| 3,242,131 | 3/1966 | Peerman | 117—21 |
| 3,253,971 | 5/1966 | Garling | 117—21 |

WILLIAM D. MARTIN, Primary Examiner

E. J. CABIC, Assistant Examiner

U.S. Cl. X.R.

117—21, 132, 161